US005518268A

United States Patent [19]
Moore et al.

[11] Patent Number: 5,518,268
[45] Date of Patent: May 21, 1996

[54] FLOW-THROUGH HEAT-ENHANCED HYBRID INFLATOR

[75] Inventors: Walter A. Moore, Ogden, Utah; Leland B. Kort, Lakewood, Colo.; Kelly B. Johnson, Layton, Utah; L. John Pierotti, Huntsville, Utah; Brett Hussey, Bountiful, Utah

[73] Assignee: Morton International, Inc., Chicago, Ill.

[21] Appl. No.: 492,339

[22] Filed: Jun. 19, 1995

[51] Int. Cl.⁶ ........................................ B60R 21/26
[52] U.S. Cl. ................................ 280/737; 280/741
[58] Field of Search ................................ 280/737, 741

[56] References Cited

U.S. PATENT DOCUMENTS

| | | | |
|---|---|---|---|
| 3,723,205 | 5/1971 | Scheffee | 149/19 |
| 3,743,318 | 7/1973 | Yamaguchi et al. | 280/150 AB |
| 3,895,821 | 7/1975 | Schotthoefer et al. | 280/150 AB |
| 3,905,515 | 9/1975 | Allemann | 222/3 |
| 3,966,228 | 6/1976 | Neuman | 280/737 |
| 4,512,355 | 4/1985 | Galbraith | 137/68 A |
| 4,600,123 | 7/1986 | Galbraith | 222/3 |
| 5,016,914 | 5/1991 | Faigle et al. | 280/741 |
| 5,022,674 | 6/1991 | Frantom et al. | 280/741 |
| 5,031,932 | 7/1991 | Frantom et al. | 280/741 |
| 5,131,680 | 7/1992 | Coultas et al. | 280/737 |
| 5,184,846 | 2/1993 | Goetz | 280/736 |
| 5,345,876 | 9/1994 | Rose et al. | 280/737 |
| 5,429,387 | 7/1995 | Clark et al. | 280/737 |

*Primary Examiner*—Kenneth R. Rice
*Attorney, Agent, or Firm*—George W. Rauchfuss, Jr.; Gerald K. White

[57] ABSTRACT

A heat-enhanced boosted inflator for a vehicle airbag includes a housing defining a storage chamber having compressed inflation gas therein and a heating cup mounted to the housing and defining a portion of a gas delivery path to the airbag. The heating cup contains a heat-producing material and the gas flows through the heat-producing material to heat-expand it. One heat-producing material is thermite (Al+ $FeO_3$) and ignitor means initiate its reaction. A cylindrical heating cup provides an annular heating chamber containing the heat-producing material and further defines an outlet plenum containing inflation gas which is released initially for a "soft" onset of inflation.

36 Claims, 4 Drawing Sheets

FLOW-THROUGH HEAT-ENHANCED HYBRID INFLATOR

FIELD OF THE INVENTION

The invention herein relates to a hybrid inflator for a vehicle airbag in which stored compressed gas flows through heat-producing material for providing a heat-expanded volume of inflation gasses.

BACKGROUND OF THE INVENTION

Hybrid inflators for vehicle airbags generally comprise a chamber storing a pressurized inert gas and a pyrotechnic adapted for discharge directed into the storage chamber. The hot gaseous products of pyrotechnic combustion enter the gas storage chamber and mix with the gas. The gas storage chamber has an exit opening which is covered by a rupturable seal, the seal being ruptured by mechanical action, by increased pressure or, in some instances, by action of the pyrotechnic itself. The inflation gasses are a mix of the stored gas and gaseous products of combustion of the pyrotechnic, with the stored gas being in part heated and expanded by the pyrotechnic. However, a certain portion of the stored gas generally flows from the storage chamber prior to being heated, thereby limiting the heat expansion of the stored gas.

One of the goals of a hybrid inflator is to reduce the volume of compressed gas which would be required for inflation of the vehicle airbag if pressurized gas alone were used. Another goal of the hybrid inflator is to reduce the amount of pyrotechnic required to inflate an airbag, at least in part to make the inflator more environmentally friendly. A further goal is to reduce particulate residue from operation of the airbag. These goals are achieved to a degree in present hybrid inflators, but further improvement in both of these areas is desirable.

SUMMARY OF THE INVENTION

It is a principal object of the invention herein to provide a high efficiency hybrid inflator for vehicle airbag systems.

It is another object of the invention herein to provide a hybrid inflator that achieves good heat exchange between stored gas and heat-producing material.

It is an additional object of the invention herein to provide a hybrid inflator which produces a desired volume of expanded inflation gasses, but utilizes a reduced amount of heat-producing material.

It is a further object of the invention herein to provide a hybrid inflator which delivers substantially inert inflation gasses.

In accomplishing these and other objects of the invention herein, there is provided a hybrid inflator generally comprising a housing defining a storage chamber having a compressed inflation gas therein and a heating cup mounted to the housing and defining at least a portion of a gas delivery passage from the storage chamber to an outlet for delivering inflation gas to a vehicle airbag. A heat-producing material is contained in the heating cup and deployed in the portion of the gas delivery passage defined by the heating cup. A seal prevents flow of inflation gas through the gas delivery passage until operation of an initiator, which activates the heat-producing material. Thereafter, the seal is ruptured and inflation gas flowing through the gas delivery passage is in close contact with the active heat-producing material, providing heat-expanded inflation gas to the vehicle airbag.

According to one aspect of the invention, the heat-producing material is essentially non gas-producing, and a particular heat-producing material includes aluminum and ferric oxide, also known as thermite. According to another aspect of the invention, the heat-producing material is a pyrotechnic, typically selected from boron potassium nitrate or polyvinyl chloride with potassium perchlorate. Binders and oxidizers are used to maintain the shape of the heat-producing material within the gas delivery passage and to control its rate of consumption. The heat-producing material is configured with spacings and openings through which the stored inflation gas flows within the gas delivery passage, increasing the proximation and thereby the heat transfer between the heat-producing material and stored inflation gas.

According to another aspect of the invention, the heat-producing material is provided in an annular portion of the gas delivery passage defined by the heating cup. According to a further aspect of the invention, the heating cup is mounted at the end of an elongated cylindrical housing defining a gas storage chamber. Alternative aspects of the invention include mounting the heating cup generally centrally in an elongated generally cylindrical housing defining the gas storage chamber, and providing a tubular portion of the gas delivery passage defined by the heating cup.

The various features of novelty which characterize the invention are pointed out with particularity in the claims annexed to and forming part of this specification. For a fuller understanding of the invention, its operating advantages and specific objects attained by its use, reference is made to the accompanying drawings and descriptive matter in which the preferred embodiments are illustrated.

BRIEF DESCRIPTION OF THE DRAWINGS

The same reference numerals refer to the same elements throughout the various figures.

DESCRIPTION OF PREFERRED EMBODIMENTS

Figure 3:
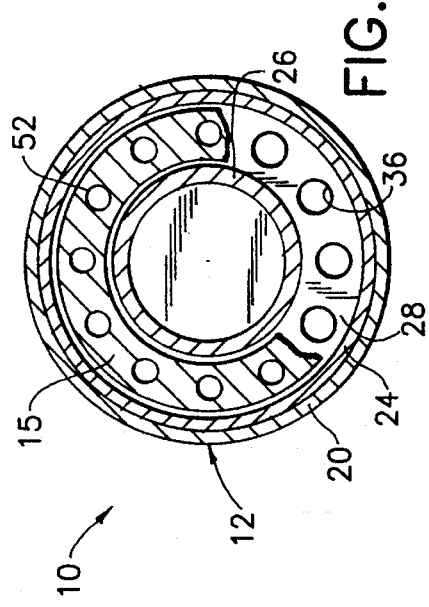
FIG. 3 is a cross-sectional view of the hybrid inflator of FIG. 1 taken along the lines 3—3 of FIG. 2 and partially cut away.
Figure 1:
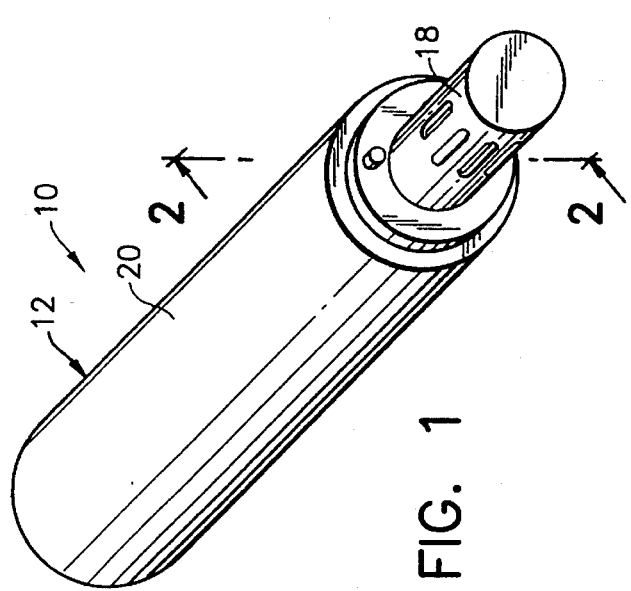
FIG. 1 is a perspective view of a heat-enhanced hybrid inflator according to the invention herein.
Figure 2:
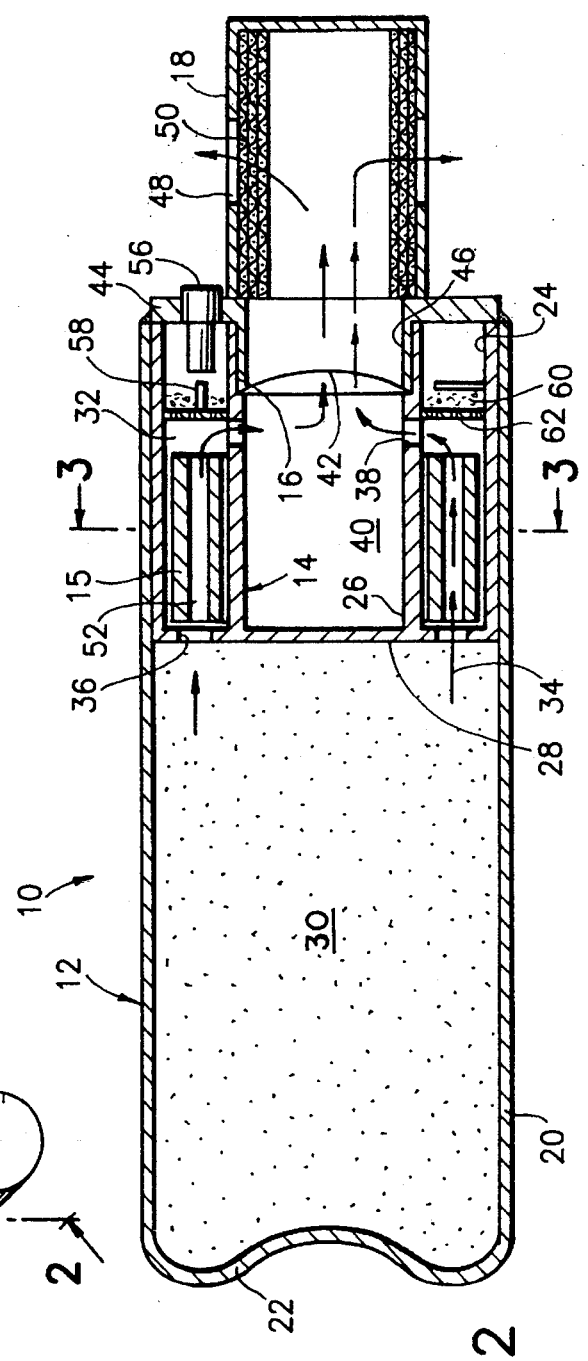
FIG. 2 is a longitudinal sectional view of the hybrid inflator of FIG. 1, taken along the lines 2—2 of FIG. 1.

A hybrid inflator 10 according to the invention herein is illustrated in FIGS. 1–3. The hybrid inflator 10 generally comprises a housing 12 having a heating cup 14 mounted therein, with an outlet opening 16 and diffuser 18 delivering gas to an airbag, not shown. The heating cup 14 contains a heat-producing material 15 for expanding the gas delivered to the airbag.

The housing 12 comprises a generally cylindrical sidewall 20 and a closed end wall 22, with the sidewall 20 having an open end opposite the closed end 22. The heating cup 14 has a cylindrical outer wall 24 which is closely received in the open end of the housing sidewall 20. The heating cup 14 also has a coaxial cylindrical inner wall 26, and a bottom wall 28. The bottom wall 28 together with the sidewall 20 and end wall 22 of the housing 12 define a gas storage chamber 30.

The heating cup 14 defines, between its outer and inner walls 24, 26 an annular heating chamber 32, which forms a portion of a gas delivery passage 34 extending from the storage chamber 30 to the exterior of the diffuser 18, the gas delivery passage being indicated by arrow marked 34 in FIG. 2. The portions of the gas delivery passage 34 in addition to the heating chamber 32 will be described in more detail below.

The bottom wall 28 of the heating cup defines a series of inlet openings 36 to the heating chamber 32, the heating chamber inlet openings forming a portion of the gas delivery passage 34. The inner cylindrical sidewall 26 of the heating cup defines a plurality of heating chamber exit orifices 38, which also form a portion of the gas delivery passage 34. The heating chamber exit orifices 38 preferably form the controlling orifices for the delivery of inflation gasses from the storage chamber 30 and, in the embodiment shown, have approximately one-fourth of the total area of the heating chamber inlet openings 36. Thus, the heating chamber exit orifices 38 produce a sonic or choked flow condition which controls the mass flow rate of gas exiting the inflator 10, after its initial stage of operation.

The heating chamber exit orifices 38 lead to an outlet plenum 40, defined by the inner wall 26 and bottom wall 28 of the heating cup 14, with the outlet opening 16 of the inflator 10 opposite the bottom wall 28. The gas delivery path 34 continues from the heating chamber exit orifices 38 through the outlet plenum 40 to the outlet opening 16. The outlet opening 16 is covered by a rupturable diaphragm 42. An end plate 44 is welded over the open end of the housing 12, positioning the heating cup therein and further defining the heating chamber. The end plate 44 has an annular, inwardly extending flange 46 which supports the rupturable diaphragm 42 across the outlet opening 16 and also forms a gas tight closure for the interior of the inflator 10.

The gas storage chamber 30 together with the heating chamber 32 and outlet plenum 40, i.e., those interior portions of the inflator 10 which are sealed off by diaphragm 42, are filled with a pressurized inert gas. The gas is preferably Argon or Nitrogen, pressurized in the range of 2000–4000 psi. It will be appreciated that the greatest amount of gas is in the storage chamber 30.

The diffuser 18 is a cup shaped member welded to the end plate 44, and includes a plurality of ports 48. The diffuser 18 also contains filter screen 50. The gas delivery path 34 continues from the outlet opening 16 through the diffuser 18 and filter screen 50 therein, and out the ports 48 in the diffuser 18. The filter screen 50 may be reduced or eliminated depending upon the choice of heat-producing material 15.

The heat-producing material 15 is deployed within the annular heating chamber 32 of the heating cup 14, between the heating chamber inlet openings 36 and the heating chamber exit orifices 38. In this embodiment, the heat-producing material is an essentially non gas-producing heating composition, one example of which is a mixture of aluminum powder and powdered iron oxide, known as thermite, in a calcium sulphate binder providing a shaped configuration and contributing to the control of the rate of reaction. A burn enhancer such as potassium perchlorate may be included in the heating composition 15, depending upon the desired performance parameters. Other essentially non gas-producing heating compositions are known, including other oxide/metal reactants which provide their own oxygen supply and produce heat but little or no gaseous products of combustion and give off little or no particulates into the delivered inflation gasses, and these should be considered equivalents to the thermite disclosed herein.

It will also be appreciated that the heat-producing material 15 may be a pyrotechnic, including boron potassium nitrate ($BKNO_3$) or polyvinyl chloride with potassium perchlorate. These also include a binder such that the heat-producing material can be formed into a shape received in the heating cup chamber.

The heat-producing material 15 is formed in a tubular shape and is loosely received in the annular heating chamber 32, i.e., there is space between the inner and outer walls of the booster chamber and the heat-producing material permitting a flow of gas thereby. In addition, the heat-producing material 15 is preferably formed with a series of longitudinal openings 52 for further gas flow through the heat-producing material, providing additional surface area in contact with the gas and minimal interference with gas flow.

The inflator 10 further comprises means for initiating the heating action of the heat-producing material 15. To this end, a squib 56 is mounted in the end plate 44 for igniting a ribbon of rapid deflagration cord 58 positioned between the inner and outer sidewalls 24, 26 of the heating cup 14. An ignitor material 60, which may be $BKNO_3$, is positioned with the rapid deflagration cord 58, supported on an annular perforated wafer 62. Depending upon the desired initial pressure pulse from the inflator, the rapid deflagration cord 58 may extend through one of the booster exit orifices 38 and be positioned along the rupturable diaphragm 42, to open the diaphragm in advance of a buildup of pressure within the inflator 10. Ignition of the igniter material can also be accomplished directly by the squib, i.e., without the rapid deflagration cord, depending on the requirements for onset of inflation.

It will be appreciated that the inflator 10 is utilized by mounting it in a reaction can having an airbag secured thereto, or is otherwise adapted to provide its output to an airbag, for inflation of the airbag.

Upon sensing of a crash condition, the squib 56 is operated by an electrical signal, and the squib ignites the rapid deflagration cord 58 and ignitor material 60. The ignitor material 60 initiates the reaction of the heat-producing material 15. This activity in the inflator 10 causes a rise in pressure, which ruptures the diaphragm 42 for delivering inflation gas. The onset of inflation can be further softened, if desired, by utilizing the rapid deflagration cord to rupture the diaphragm 42 prior to substantial pressure buildup in the inflator.

The main volume of inflation gas comes from the storage chamber 30, and flows through the gas delivery passage 34, including the heating chamber and active heat-producing material therein. The gas is heated and expanded very efficiently by its close contact with the heat-producing material 15 and is delivered through the remainder of the gas delivery path in a highly expanded condition. The heat-producing material and the gas delivery passage cooperate to permit the heat-producing material to react to depletion, e.g., the gas delivery path does not form any venturi which would produce cooling of the heat-producing material to stop its reaction. Because the heat-producing material is positioned to deliver its heat to the stored gas so efficiently, the amount of heat-producing material required to expand the gas is reduced with respect to designs which have lesser heat exchange capability. Similarly, because the volume of delivered inflation gas is efficiently heat expanded, the volume of stored gas may also be reduced, within the requirements of the particular airbag being inflated.

Figure 4:
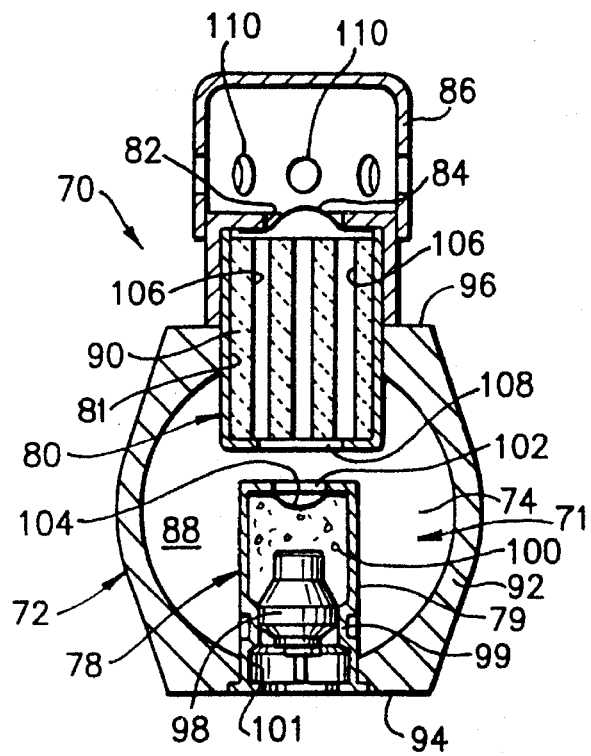
FIG. 4 is a cross-sectional view of another hybrid inflator according to the invention herein.
Figure 5:
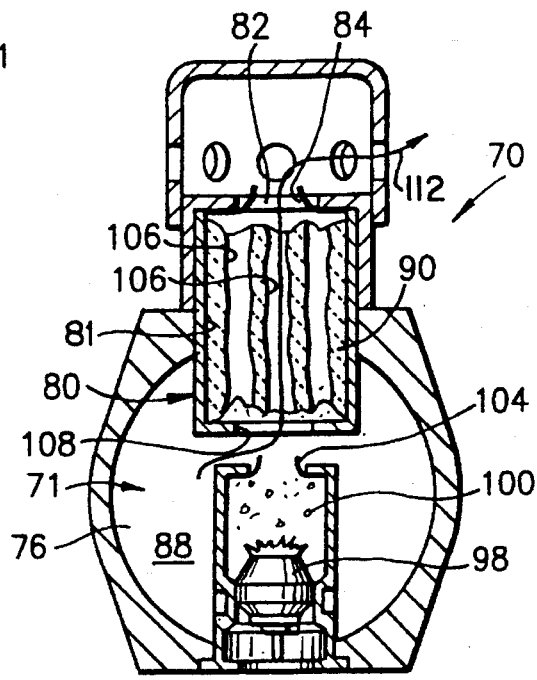
FIG. 5 is a cross-sectional view of the hybrid inflator of FIG. 4, taken in the direction opposite from the view of FIG. 4, with the inflator in operation.

With reference to FIGS. 4 and 5, another inflator 70 according to the invention herein is illustrated. It generally comprises an elongated housing 71 having a center frame 72 and tubular end caps 74 and 76. The two sectional views of FIGS. 4 and 5 are taken in opposite directions, so that end cap 74 is seen in FIG. 4 and end cap 76 is seen in FIG. 5. The inflator 70 further generally comprises an ignitor unit 78 and a heating cup 80 defining an outlet orifice 82 covered by a rupturable diaphragm 84. These are positioned generally centrally in the housing 71. A diffuser 86 is mounted above the outlet orifice 82. The elongated housing 71 defines a chamber 88 for storing an inert gas, such as Nitrogen or Argon, under pressure.

The inflator 70 is characterized by the interior of the heating cup 80 defining a heating chamber 81 containing heat-producing material 90 through which the stored inert gas flows, as more fully described below. The heat-producing material 90 in the embodiment disclosed herein is an essentially non gas-producing heating composition comprising a bound mixture of aluminum powder and powdered iron oxide, known as thermite. A burn enhancer such as potassium perchlorate may be provided.

The center frame 72 is cut from extruded stock. The end caps 74 and 76 are tubular with integral hemispherical ends, and are welded to the center frame 72. The center frame 72 has a circumferential wall 92 with a flat bottom surface 94 and flat top surface 96. The ignitor unit 78 is generally cylindrical and is mounted in the center frame through the circumferential wall and flat bottom surface 94. The ignitor unit 78 includes a squib 98 and ignitor material 100, which in this embodiment is boron potassium nitrate ($BKNO_3$). The wall 79 of unit 78 is crimped at 99 to retain the squib, and the wall 79 forms a socket 101 for receiving a plug connector to the squib terminals. The ignitor unit 78 defines an exit opening 102 covered by a rupturable seal 104. The amount of heat-producing material 90 is substantially less than that of a hybrid inflator relying upon pyrotechnic for heating and expanding stored gas.

The heating cup 80 is mounted through the flat top surface 96 and circumferential wall 92 of the center frame 72. The heating cup unit contains the heating composition 90, formed in a cylindrical shape having a plurality of longitudinal openings 106 therethrough. Alternatively, the heating composition can be provided in porous or pelletized form to provide passages, or as a solid with passage space about its exterior. All of these configurations are considered as having openings therethrough. The heating composition, upon heat activation, reacts at very high temperatures, in excess of 2000° C. The oxide/metal reaction provides its own oxygen supply, and produces heat but little or no gaseous products of combustion and little or no particulates.

The heating cup 80 defines an inlet opening 108 at the interior end thereof, such that the longitudinal openings 106 in the heating composition provide communication from the bottom opening 108 through the booster chamber 81 to the outlet orifice 82. In the embodiment shown, the outlet orifice 82 controls gas delivery from the inflator, although the opening 108 can also be sized for that purpose. The diffuser 86 is secured over the heating cup 80, and includes a plurality of spaced apart openings 110 for dispersing inflation gasses. Although not shown, a screen filter may be positioned within the diffuser 86.

Thus, the hybrid inflator 70 has a gas delivery path 112 from the gas storage chamber 88 through the heating chamber 81 to the outlet orifice 82 and through the diffuser 86. The gas delivery path is characterized by a close contact with the heat-producing material 90. The gas delivery path is shaped to permit the heat-producing material to react to depletion.

The inflator 70 is typically mounted in a reaction can in association with an airbag, such that the inflation gasses are directed to inflating the airbag. With reference to FIG. 5, upon sensing of a vehicle crash, an electrical signal is provided to the squib 98, which operates to ignite the ignitor material 100. This causes the seal 104 to rupture, and an expulsion of hot products of combustion impinges upon the heating composition 90 through the opening 108 in the heating cup 80, thereby igniting it. The pyrotechnic igniter material and heat-generating reaction also increase the pressure in the gas storage chamber 88, rupturing the diaphragm 84 over outlet orifice 82.

Gasses exiting the inflator 70 through outlet orifice 82 pass through the heating chamber 81 and around and through the passages 106 in the heating composition 90 contained therein, with the outlet orifice 82 controlling the outlet flow. Because the heating composition reacts at a very high temperature, the gas flowing through the heating composition is heated and expanded, with the expansion of the gas contributing to inflation of the airbag.

Figure 6:
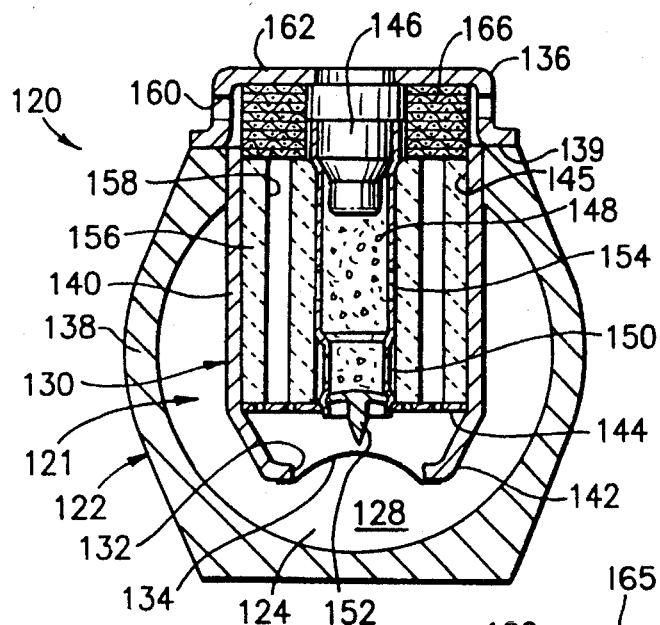
FIG. 6 is a cross-sectional view of another hybrid inflator according to the invention herein.
Figure 7:
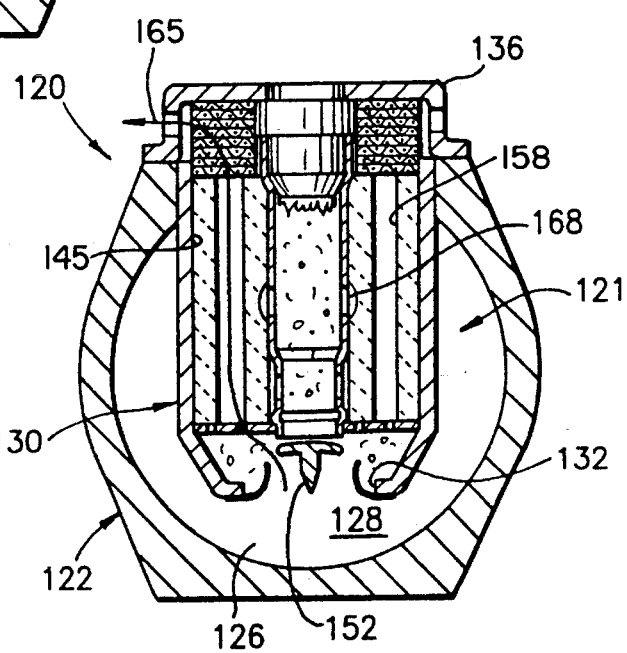
FIG. 7 is a cross-sectional view of the hybrid inflator of FIG. 6, taken in the direction opposite from the view of FIG. 6, with the inflator in operation.

FIGS. 6 and 7 illustrate another inflator 120 according to the invention herein. The inflator 120 has an elongated housing 121 generally comprised of a center frame 122 fitted with end caps 124 and 126, respectively, shown in the opposite direction views of FIG. 6 and FIG. 7, to form a gas storage chamber 128. A heating cup 130 including an ignitor is mounted in the center frame 122 and the heating cup defines an outlet orifice 132 covered by a diaphragm 134. The heating cup 130 also mounts a diffuser 136 for delivering the flow of inflation gasses to an airbag. The center frame 122 is cut from extruded stock to the desired axial length for accommodating the heating cup 130. The center frame 122 has a circumferential wall 138 and a flat top surface 139, through which the heating cup 130 is mounted extending into the gas storage chamber 128.

The heating cup 130 includes a tubular sidewall 140 which tapers inwardly at its lower end 142 to define the outlet orifice 132. The rupturable diaphragm 134 deployed across the outlet orifice 132 retains an inert gas such as Argon or Nitrogen within the pressure chamber 128 at a typical pressure of 2,000–4,000 psi.

An annular perforated panel 144 extends across the sidewall 140 at the transition to its lower end 142, and supports an ignition tube 150 centrally within the heating cup 130. The ignition tube is shaped at its upper portion to receive a squib 146, and below the squib 146, the ignition tube contains a pyrotechnic 148, which is boron potassium nitrate ($BKNO_3$). At the lower end of the ignition tube 150, a projectile 152 is releasably engaged in the ignition tube and aimed toward the burst disk 134. The ignition tube also defines radially disposed openings 154 from the pyrotechnic 148.

The annular space between the sidewall 140 and the ignition tube 150 defines a heating chamber 145 containing heat-producing material 156, which is preferably an essentially non gas-producing heating composition such as thermite, as described above. The heating composition is provided in a tubular configuration within the heating chamber 145 and has a series of longitudinal openings 158, so that gas may flow from the outlet orifice 132 through the heating composition to the diffuser 136. Also as noted above, the openings can be provided as interstices of porous material, about the exterior of a mass of bound heating composition, or the heating composition can be provided in pellet form.

The diffuser 136 is mounted to the center frame 122 above the unit 130. The diffuser 136 is generally cup-shaped and defines openings 160 in its sidewall for delivering inflation gasses, and these openings also serve to control the rate of delivery of inflation gas. The top wall 162 of the diffuser defines opening 164 for receiving a plug connector to terminals of the squib 146. Filter screen 166 is contained within the diffuser, to remove debris from the inflation gasses.

Thus, the inflator 120 has a gas delivery passage 165 from the gas storage chamber 128 through the outlet orifice 132, heating cup 130 and the heat-producing material 156 therein, and through the diffuser 136 and diffuser outlets 160. This passage permits the heat-producing material therein to react to depletion.

The inflator 120 is typically mounted in a reaction can having an airbag mounted thereto, such that inflation gasses from the diffuser are delivered to the interior of the airbag. The inflator 120 operates upon receipt of an electrical impulse from a crash sensor, which fires the squib 146. The squib ignites the pyrotechnic 148 and its rapidly expanding products of combustion drive the projectile 152 downwardly to burst the diaphragm 134. The pyrotechnic gas blows through the radial openings 154 in the ignition tube and ignites the heating composition 156, as indicated at 168. The heating composition is also ignited in other areas, and particularly along the openings 158, by the products of combustion exiting the lower end of ignition tube 150. Although the pyrotechnic produces some hot gasses, its primary function is to initiate the reaction of the heating composition.

Upon rupture of the diaphragm 134, the pressurized gas in storage chamber 128 flows along the gas delivery path 165 through the outlet orifice 132 and heating composition 156, and exits the inflator through the diffuser openings 160. Because the projectile ruptures the burst disk prior to substantial heat build-up in the heating cup 130, the early flow of gas is somewhat "soft" and serves to initially deploy the airbag prior to the onset of rapid, heat-enhanced inflation. The enhanced inflation occurs when the heating composition is fully initiated, and the gas flowing therethrough is substantially heated and expanded.

Figure 8:
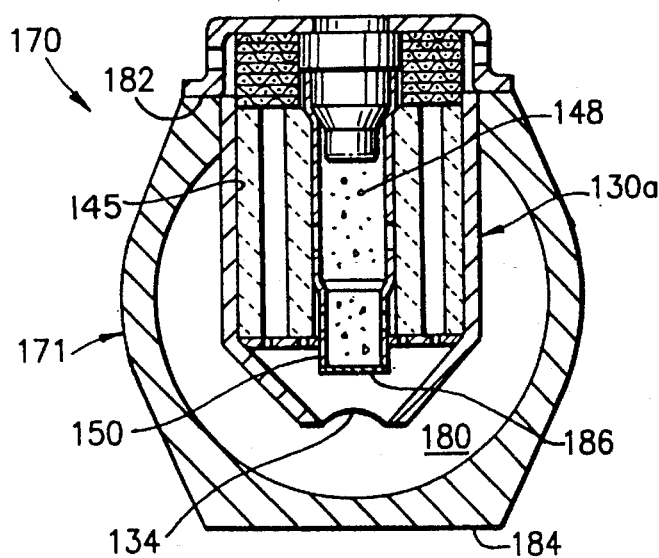
FIG. 8 is a cross-sectional view of another hybrid inflator according to the invention herein.
Figure 9:
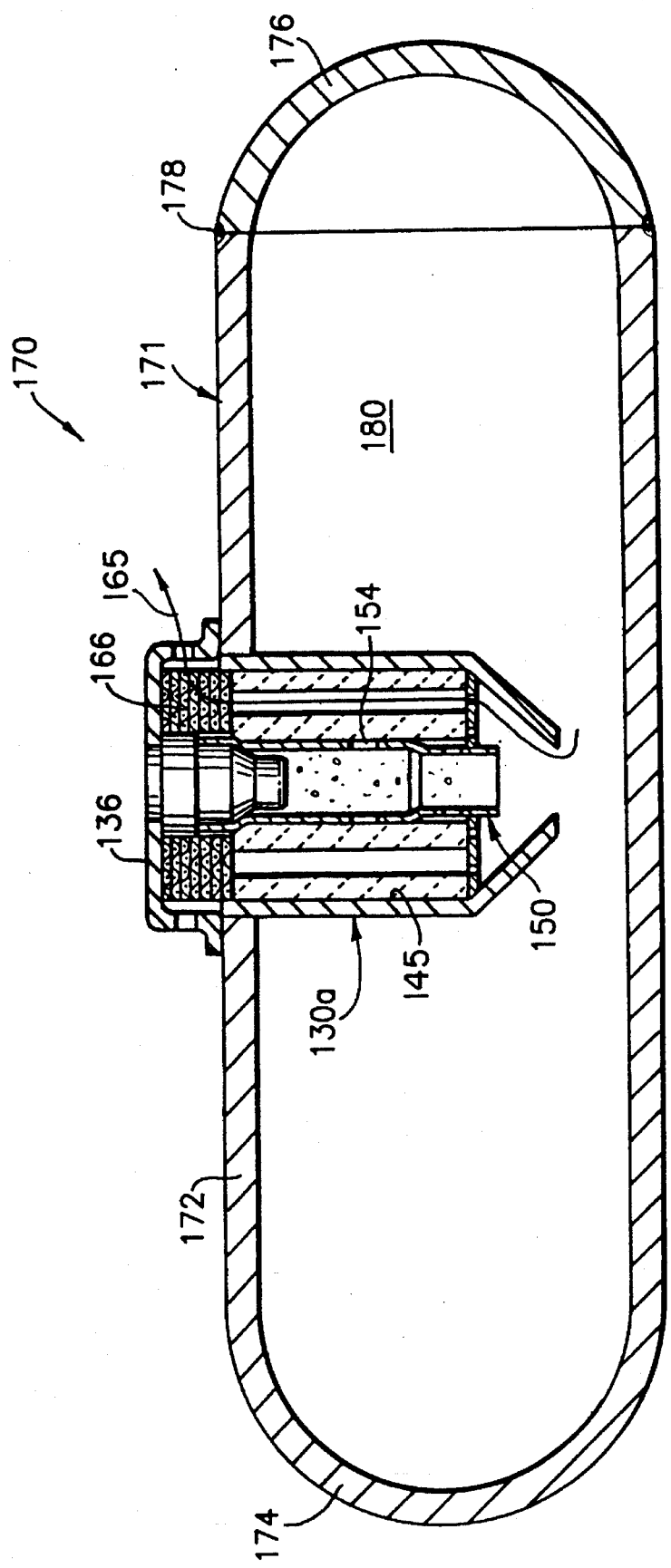
FIG. 9 is a longitudinal sectional view of the hybrid inflator of FIG. 8, with the inflator in operation.

With reference to FIGS. 8 and 9, another inflator 170 according to the invention herein is illustrated. It is characterized by an elongated housing 171 including a deep drawn center frame 172 having an integral end wall 174 and a second end wall provided by end cap 176 secured to the open end of the center frame 172 by weld 178, thereby defining a chamber 180 for storing pressurized inert gas. The center frame is preferably deep drawn with flat upper and lower surfaces 182 and 184, thereby adapting the housing to receive units, such as the ignitor unit 78 and heating cup 80, or heating cup 130 with ignitor. However, a housing without flat surfaces also suffices.

Inflator 170 employs heating cup 130a which is highly similar to heating cup 130 but is characterized by a rupturable seal 186 positioned over the end of the ignition tube 150 in place of the projectile 152 of inflator 120. Thus, the diaphragm 134 is ruptured by heat and pressure generated upon ignition of the pyrotechnic 148 rather than mechanically by the projectile. FIG. 9 shows the inflator 170 after the squib has ignited the pyrotechnic 148, rupturing seal 186 and burst disc 134 and activating the heating composition through openings 154 in tube 150. Thereafter, inflation gasses flow through gas delivery path 165 from gas storage chamber 180 through the heating chamber 145 of heating cup 130a and out the diffuser 136.

Each of the above inflators utilizes a flow of stored inflation gas through a heating cup containing heat-producing material, such that there is close contact and good heat exchange from the heat-producing material to the flowing gas, which reacts to depletion. This provides efficient expansion of the stored gas with a commensurate decrease in the amount of heat-producing material.

Accordingly, preferred embodiments of hybrid inflators have been described which admirably achieve the objects of the invention herein. With reference to the description of the preferred embodiments, those skilled in the art will appreciate that modifications may be made without departing from the spirit of the invention. Therefore, it is not intended that the scope of the invention be limited to the specific embodiments illustrated and described. Rather, it is intended that the scope of the invention be determined by the appended claims and equivalents thereof.

We claim:

1. A heat-augmented inflator for a vehicle airbag, the inflator comprising:

A) a housing defining a storage chamber having a compressed inflation gas therein;

B) a heating cup mounted to said housing and defining at least a portion of a gas delivery passage from the storage chamber to an outlet for delivering inflation gas to the vehicle airbag;

C) heat-producing material contained in the heating cup and deployed in the gas delivery passage, the heat-producing material and gas delivery passage cooperative to permit the heat-producing material to react to depletion upon being initiated;

D) a rupturable diaphragm preventing flow of inflation gas through the gas delivery passage; and E) initiator means for initiating heat production by the heat-producing means;

wherein upon operation of the initiator means, operation of the heat-producing means is initiated and the diaphragm ruptures to permit a flow of inflation gas through the gas delivery passage and the operative heat-producing material therein, providing heat-expanded inflation gas to the vehicle airbag.

2. A heat-augmented inflator as defined in claim 1 wherein the heat-producing material is an essentially non gas-producing heating composition.

3. A heat-augmented inflator as defined in claim 2 wherein the essentially non gas-producing heating composition includes a metal and a metal oxide selected for heat-producing reaction.

4. A heat-augmented inflator as defined in claim 3 wherein the essentially non gas-producing heating composition further includes a binder for maintaining the composition as a shaped solid.

5. A heat-enhanced inflator as defined in claim 4 wherein the openings are longitudinally openings extending generally in the direction of flow through the gas delivery passage.

6. A heat-enhanced inflator as defined in claim 3 wherein the heat-producing material is an essentially non gas-producing heating composition including aluminum powder and ferric oxide.

7. A heat-enhanced inflator as defined in claim 1 wherein the heating composition further includes a binder maintaining the heating composition in a shaped solid configuration.

8. A heat-enhanced inflator as defined in claim 7 wherein the heating composition defines a plurality of openings therethrough for increasing surface area contact with gas flowing through the heating cup.

9. A heat-enhanced inflator as defined in claim 8 wherein the openings are longitudinally openings extending generally in the direction of flow through the gas delivery passage.

10. A heat-enhanced inflator as defined in claim 7 wherein reaction of the heating composition is initiated by a squib and pyrotechnic ignitor material.

11. A heat-enhanced inflator as defined in claim 10 wherein the pyrotechnic material is ignited by the squib and by a rapid deflagration cord.

12. A heat-enhanced inflator as defined in claim 1 wherein the heating cup defines an annular heating chamber forming a portion of the gas delivery passage and containing the heat-producing material.

13. A heat-enhanced inflator as defined in claim 12 wherein the annular heating chamber is defined by concentric inner and outer cylindrical walls of the heating cup, and the heating cup further defines an outlet plenum comprising a portion of the gas delivery passage, and providing an initial flow of unheated inflation gas upon rupture of the seal.

14. A heat-enhanced inflator as defined in claim 13 wherein the heating cup is positioned at the end of a cylindrical housing, with the outer cylindrical wall of the heating cup received in the cylindrical sidewall of the cylindrical housing.

15. A heat-enhanced inflator as defined in claim 14 wherein the initiator means includes a squib and ignitor material adjacent the heating composition in the annular heating chamber.

16. A heat-enhanced inflator as defined in claim 15 wherein the initiator means includes a rapid deflagration cord extending around the annular heating chamber.

17. A heat-enhanced inflator as defined in claim 13 wherein the annular heating chamber has a plurality of inlet openings from the gas storage chamber for delivering gas flow along the gas delivery passage to the heating composition material, and the heating chamber has a plurality of exit orifices for delivering heated inflation gasses from the heating composition, the flow area of the exit orifices being substantially less than the flow area of the inlet openings.

18. A heat-enhanced inflator as defined in claim 12 wherein the diaphragm is deployed across an opening in the heating cup leading from the gas storage chamber, and the initiator means is surrounded by the annular heating chamber and directed to rupture the diaphragm to initiate flow through the gas delivery passage.

19. A heat-enhanced inflator as defined in claim 18 wherein the initiator means further includes a projectile for rupturing the rupturable seal.

20. A heat-enhanced inflator as defined in claim 1 wherein the heating cup is deployed centrally in an elongated housing defining the gas storage chamber.

21. A heat-enhanced inflator as defined in claim 20 wherein the initiator means is deployed in a unit mounted in the elongated housing below the heating cup.

22. A heat-enhanced inflator as defined in claim 1 wherein the heat-producing material is a gas-producing pyrotechnic.

23. A heat-enhanced inflator as defined in claim 22 wherein the pyrotechnic is boron potassium nitrate.

24. A heat-enhanced inflator as defined in claim 22 wherein the pyrotechnic is polyvinyl chloride with potassium perchlorate.

25. A heat-enhanced inflator for a vehicle airbag, the inflator comprising:

A) a housing having a cylindrical sidewall, a first end wall, and an open end;

B) a generally cylindrical heating cup mounted in the open end of the housing, the heating cup including a cylindrical outer wall closely received in the cylindrical sidewall of the housing, a bottom wall and an inner wall extending from the bottom wall concentric with the outer wall;

C) a second end wall extending across the open end of the housing between the concentric outer and inner walls of the heating cup, and defining an outlet opening circumscribed by the inner wall of the heating cup;

D) a rupturable diaphragm sealing the outlet opening defined by the second end wall;

E) a storage chamber defined by the cylindrical sidewall and end wall of the housing and the bottom wall of the heating cup;

F) an outlet plenum defined by the bottom and inner wall of the heating cup and by the rupturable diaphragm;

G) an annular heating chamber defined between the inner and outer sidewalls of the heating cup, the bottom wall of the heating cup defining a plurality of inlet openings to the heating chamber and the inner wall of the heating cup defining a plurality of exit orifices from the heating chamber to the outlet plenum;

H) a diffuser secured to the inflator housing over the outlet opening, the diffuser defining a plurality of outlet ports;

I) a gas delivery passage extending from the gas storage chamber through the inlet openings to the annular booster chamber, through the heating chamber and the exit orifices therefrom to the outlet plenum, from the outlet plenum through the outlet opening to the diffuser, and out the outlet ports of the diffuser, the gas delivery passage blocked by the rupturable diaphragm until operation of the inflator;

J) heat-producing material in the portion of the gas delivery chamber formed by the annular heating chamber;

K) an inert gas stored under pressure within the storage chamber of the cylindrical housing, the annular booster chamber and the outlet plenum, the gas sealed therein by the rupturable diaphragm until operation of the inflator; and L) means for initiating heat production by the heat-producing material;

wherein after initiation of the heat-producing material, the diaphragm ruptures to permit an initial flow of inflation gasses from the outlet plenum and a flow of inflation gasses along the gas delivery passage, the gasses being heated and expanded by the heat-producing material in the annular heating chamber.

26. A heat-enhanced inflator as defined in claim 25 wherein the heat-producing material is an essentially non gas-producing heating composition including a metal and a metal oxide held in a solid shape by a binder, the solid shape of heating composition being configured to provide flow passages through the heating chamber when the heating composition is contained therein.

27. A heat-enhanced inflator as defined in claim 25 wherein the means for initiating operation of the heating composition comprises a squib mounted in the end wall of the housing and extending into the annular heating chamber, and pyrotechnic material deployed in an annular path about the heating chamber adjacent the heating composition contained therein.

28. A heat-enhanced inflator as defined in claim 27 and further including rapid deflagration cord deployed about the annular heating chamber adjacent the heating composition therein and in contact with the pyrotechnic material.

29. A heat-enhanced inflator as defined in claim 25 wherein the exit orifices from the heating chamber have substantially less flow area than the inlet openings to the heating chamber, and the exit orifices of the heating chamber produce a choked flow condition which controls the mass flow rate of gasses exiting the inflator.

30. A heat-enhanced inflator for a vehicle airbag, the inflator comprising:

A) a housing;

B) a heating cup mounted to the housing, the housing and heating cup together defining a storage chamber containing compressed inflation gas;

C) the heating cup defining an outlet orifice from the gas storage chamber covered by a rupturable diaphragm and the heating cup containing an essentially non gas-producing heating composition positioned in a gas delivery passage of stored gas through the heating cup; and D) initiator means including a squib and a pyrotechnic material, the initiator adapted to apply the pyrotechnic material, upon ignition thereof by the squib, to the heating composition for initiating a heat-producing reaction thereof;

wherein, after operation of the squib, the diaphragm ruptures to permit a flow of inflation gas through the heating cup and the reacting heating composition therein, and the gas delivery passage and heating cup are configured to permit the heating composition to react to depletion, thereby delivering heat-expanded inflation gas for inflating the vehicle airbag.

31. A heat-enhanced inflator as defined in claim 30 wherein the heating composition includes aluminum powder, powdered ferric oxide and a binder in a solid configured to define a plurality of passages through which stored gas passes in exiting the inflator.

32. A heat-enhanced inflator as defined in claim 30 wherein the initiator means is deployed in the heating cup and the heating cup has an upper end mounted to the housing and a lower end within the housing and defining the rupturably sealed outlet orifice, whereby the stored gas flows through the outlet orifice prior to heating by the heating composition.

33. A heat-enhanced inflator as defined in claim 32 wherein the squib and pyrotechnic material of the initiator means are directed to rupture the diaphragm covering the outlet orifice.

34. A heat-enhanced inflator as defined in claim 33 wherein the initiator means further includes a projectile adapted to be driven through the diaphragm covering the outlet orifice upon ignition of the pyrotechnic material.

35. A heat-enhanced inflator as defined in claim 30 wherein the housing is elongated and the heating cup is mounted generally centrally in the sidewall of the elongated housing.

36. A heat-enhanced inflator as defined in claim 35 wherein the initiator means is mounted generally centrally in the sidewall of the elongated housing opposite and directed toward the heating cup and the heating composition therein.

* * * * *